Patented Dec. 7, 1926.

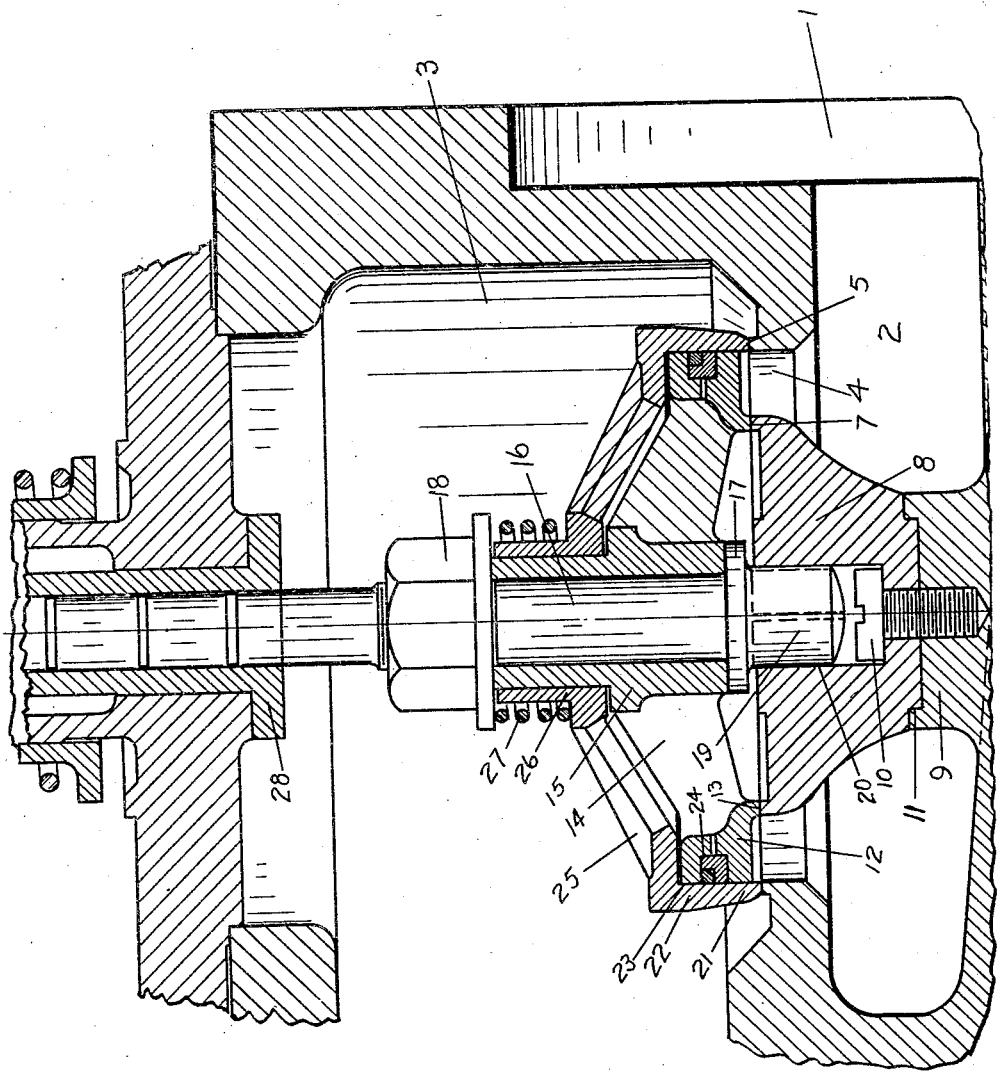

1,609,763

UNITED STATES PATENT OFFICE.

HERMAN G. MUELLER, OF ERIE, PENNSYLVANIA, ASSIGNOR TO SKINNER ENGINE COMPANY, OF ERIE, PENNSYLVANIA, A CORPORATION OF PENNSYLVANIA.

VALVE.

Application filed August 20, 1923. Serial No. 658,433.

This invention is designed to improve the construction of double beat valves bringing their valve closures into comparatively small space so that when used in connection with such devices as steam engine cylinders the clearance may be correspondingly reduced. With such valves it is desirable to permit of an independent seating of the two seating faces of the valve so that a perfect seating may be had notwithstanding any distortion due to heat. The invention involves also features and details of construction which will appear from the specification and claims.

The invention is illustrated in the accompanying drawing wherein 1 marks a cylinder, 2 a port leading to the cylinder, 3 a valve chamber, 4 an annular port or valve opening leading from the valve chamber to the port 2, and 5 an outer seat surrounding the port 4. A seat 7 is arranged around the inside of the port 4. These two seats 5 and 7 are preferably in the same plane. At any rate one is arranged within the other.

The seat 7 is preferably carried by a block 8 which is mounted on a post 9 and secured thereon by a screw 10. The post 9 has a socket 11 receiving the block so as to accurately center the same. An inner valve head 12 has a seating surface 13 adapted to seat on the surface 7. It has an annular or peripheral wall on which the seating surface is arranged and this wall is connected by arms 14 with a hub 15. The hub is mounted on a stem 16. The stem has a shoulder 17 and a nut 18 clamps the hub 15 against the shoulder 17.

If desired the stem may be extended at 19 and the block 8 provided with a guiding socket 20 receiving the extension 19.

The outer valve has a head 21 with a seating surface adapted to seat on the seat 5. It has an annuler ring 22 which carries the seating surface, the inner surface 23 of this ring being cylindrical and forming a joint with the outer surface of the ring forming the inner valve head. A packing ring 24 is arranged in the valve head 12 making the joint between the two heads steam-tight. The annular ring 22 is connected by arms 25 with a hub 26, the hub being slidably mounted on the hub 15 and capable of limited movement relative thereto. A spring 27 arranged around the hub 26 and tensioned against the nut 18 yieldingly holds the head 21 against the head 12 until after the head 21 engages its seat, with the seating surface of the head 21 slightly in advance of the seating surface of the head 12.

The stem 16 has an extension which passes through the usual bushing or joint 28 and from which the valve may be actuated by any valve gear (not shown) as desired.

It will readily be seen that there is a free communication through the arms 14 and 25 and past the inner valve head to the port as well as a free communication around the outer head to the port. The two valve heads have a relative movement so that they may seat successively and independently and the valve passages below the closure are very slight as compared with most double beat valves.

What I claim as new is:—

1. In a valve, the combination of two annular seats, one within the other and bounding an annular opening; and valve heads, one for each seat, said heads having openings therein affording communication to the inner side of the inner seat and having a sealed joint between them, said heads being capable of relative movement to permit them to seat successively and independently.

2. In a valve, the combination of two annular seats, one within the other and bounding an annular opening; valve heads, one for each seat, said heads having openings therein affording communication to the inner side of the inner seat and together adapted to close said annular opening; a stem on which said heads are mounted, one of said heads being slidably mounted on the stem; and means for yieldingly holding the sliding head against the other head when the valve is in open position.

3. In a valve, the combination of two annular seats, one within the other and bounding an annular opening; a post supporting the inner seat; and valve heads one for each seat, said heads having openings therein affording communication to the inner side of the inner seat and together adapted to close the annular opening and having a sealed joint between them, said heads being capable of relative movement to permit them to seat successively and independently.

4. In a valve, the combination of two annular seats, one within the other and bounding an annular opening; means supporting the inner seat, said means having a guiding device therein; valve heads, one for each seat, said heads having openings therein affording communication with the inner side of the inner seat and together adapted to close said annular opening; a stem on which said heads are mounted, one of said heads being slidably mounted on the stem; and mechanism yieldingly adapted to move the sliding head relatively to the other head and yieldingly hold it against the latter, said stem coacting with the guiding device in said means for alining the valve heads with their seats.

In testimony whereof I have hereunto set my hand.

HERMAN G. MUELLER.